(12) United States Patent
Liao et al.

(10) Patent No.: US 8,416,034 B2
(45) Date of Patent: Apr. 9, 2013

(54) SIGNAL SPLITTING DEVICE AND WIRELESS COMMUNICATION DEVICE USING THE SAME

(75) Inventors: Shen Yi Liao, Hsinchu County (TW); Shao Chin Lo, Hsinchu County (TW)

(73) Assignee: Ralink Technology Corporation, Hsinchu County (TW)

( * ) Notice: Subject to any disclaimer, the term of this patent is extended or adjusted under 35 U.S.C. 154(b) by 402 days.

(21) Appl. No.: 12/903,665

(22) Filed: Oct. 13, 2010

(65) Prior Publication Data

US 2011/0086596 A1    Apr. 14, 2011

(30) Foreign Application Priority Data

Oct. 14, 2009   (TW) ................................ 98134718 A

(51) Int. Cl.
*H03H 7/38*    (2006.01)
*H03H 7/46*    (2006.01)
*H04B 1/48*    (2006.01)
*H04B 1/50*    (2006.01)

(52) U.S. Cl.
USPC ........... 333/124; 333/126; 333/129; 333/132; 333/134; 455/78; 455/80; 455/82

(58) Field of Classification Search .......... 333/124–129, 333/132–134, 32, 33; 455/78, 80, 82, 83
See application file for complete search history.

(56) References Cited

U.S. PATENT DOCUMENTS

| | | | | |
|---|---|---|---|---|
| 5,015,973 | A * | 5/1991 | Kawakami et al. | 333/132 |
| 5,650,756 | A * | 7/1997 | Hayashi | 333/100 |
| 7,043,285 | B2 * | 5/2006 | Boyle | 455/575.7 |
| 2004/0227586 | A1 * | 11/2004 | Taniguchi et al. | 333/133 |
| 2007/0096842 | A1 * | 5/2007 | Hyun et al. | 333/1.1 |

* cited by examiner

*Primary Examiner* — Barbara Summons
(74) *Attorney, Agent, or Firm* — Hamre, Schumann, Mueller & Larson, P.C.

(57) ABSTRACT

A signal splitting apparatus comprises a micro-strip line, a first inductor and a second inductor. A first end and a second end of the micro-strip line are grounded via a first capacitor and a second capacitor, respectively. The first end and the second end of the micro-strip line are electrically coupled to a receiving part of a transceiver and a transmitting part of the transceiver, respectively. One end of the first inductor is coupled to the first end of the micro-strip, and the other end of the first inductor is electrically coupled to an antenna module and grounded via a third capacitor. One end of the second inductor is coupled to the second end of the micro-strip, and the other end of the second inductor is electrically coupled to the antenna module.

22 Claims, 7 Drawing Sheets

SIGNAL SPLITTING DEVICE AND WIRELESS COMMUNICATION DEVICE USING THE SAME

BACKGROUND OF THE INVENTION

1. Field of the Invention

The present invention relates to a signal splitting apparatus, and more particularly, to a passive signal splitting apparatus.

2. Description of the Related Art

A transmitting and receiving apparatus of a wireless communication system usually comprises a transceiver coupled to an antenna module, wherein the transceiver processes transmitting and receiving signals, and the antenna module transmits and receives signals. If the transceiver comprises a transmitting part and a receiving part, two independent signal propagation paths are required for the transmitting part and the receiving part to prevent signal interference. A conventional transmitting and receiving apparatus may comprise two antennas corresponding to the transmitting part and the receiving part respectively to serve as two independent signal propagation paths. However, the additional antenna increases the size of the transmitting and receiving apparatus, which accordingly increases manufacturing costs and thus does not meet consumers' requirement.

A signal splitting apparatus can be utilized to overcome this problem. FIG. 1 shows a conventional signal splitting apparatus applied to a wireless transmitting and receiving apparatus. As shown in FIG. 1, the signal splitting apparatus 100 comprises a first port 102, a second port 104, a third port 106 and a control port 108. The first port 102 is coupled to an antenna module 110. The second port 104 is coupled to a receiving part 122 of a transceiver 120 via a capacitor 130. The third port 106 is coupled to a transmitting part 124 of the transceiver 120 via a capacitor 140. The control port 108 is coupled to a control port 126 of the transceiver 120 via a control signal line.

When the transceiver 120 is operated in a transmitting mode, the transceiver 120 outputs a switch signal, which propagates through the control signal line, to the signal splitting apparatus 100. Accordingly, the first port 102 is electrically coupled to the second port 104, and the antenna module 110 is coupled to the transmitting part 124. When the transceiver 120 is operated in a receiving mode, the transceiver 120 outputs another switch signal, which propagates through the control signal line, to the signal splitting apparatus 100. Accordingly, the first port 102 is electrically coupled to the third port 106, and the antenna module 110 is coupled to the receiving part 122. By utilizing the signal splitting apparatus 100 shown in FIG. 1, only one antenna is required in the antenna module 110, and accordingly, the manufacturing cost is reduced. However, a control signal line is required between the signal splitting apparatus 100 and the transceiver 120 and thus increases the layout area of the wireless transmitting and receiving apparatus. In addition, the control of the signal splitting apparatus 100 increases the design complexity of the transceiver 120.

Accordingly, there is a need for a signal splitting apparatus, which can replace conventional signal splitting apparatuses without the additional control signal line, and exhibits the advantage of low manufacturing cost.

SUMMARY OF THE INVENTION

The signal splitting apparatus according to one embodiment of the present invention comprises a micro-strip line, a first inductor and a second inductor. A first end and a second end of the micro-strip line are grounded via a first capacitor and a second capacitor, respectively. The first end and the second end of the micro-strip line are electrically coupled to a receiving part of a transceiver and a transmitting part of the transceiver, respectively. One end of the first inductor is coupled to the first end of the micro-strip, and the other end of the first inductor is electrically coupled to an antenna module and grounded via a third capacitor. One end of the second inductor is coupled to the second end of the micro-strip, and the other end of the second inductor is electrically coupled to the antenna module.

The wireless communication device according to one embodiment of the present invention comprises a baseband processor, a transceiver and a signal splitting apparatus. The transceiver is coupled to the baseband processor. The signal splitting apparatus is couple to the transceiver, and comprises a micro-strip line, a first inductor and a second inductor. A first end and a second end of the micro-strip line are grounded via a first capacitor and a second capacitor, respectively. The first end and the second end of the micro-strip line are electrically coupled to a receiving part of the transceiver and a transmitting part of the transceiver, respectively. One end of the first inductor is coupled to the first end of the micro-strip, and the other end of the first inductor is electrically coupled to an antenna module and grounded via a third capacitor. One end of the second inductor is coupled to the second end of the micro-strip, and the other end of the second inductor is electrically coupled to the antenna module.

BRIEF DESCRIPTION OF THE DRAWINGS

The objectives and advantages of the present invention will become apparent upon reading the following description and upon referring to the accompanying drawings of which.

DETAILED DESCRIPTION OF THE INVENTION

Figure 1:
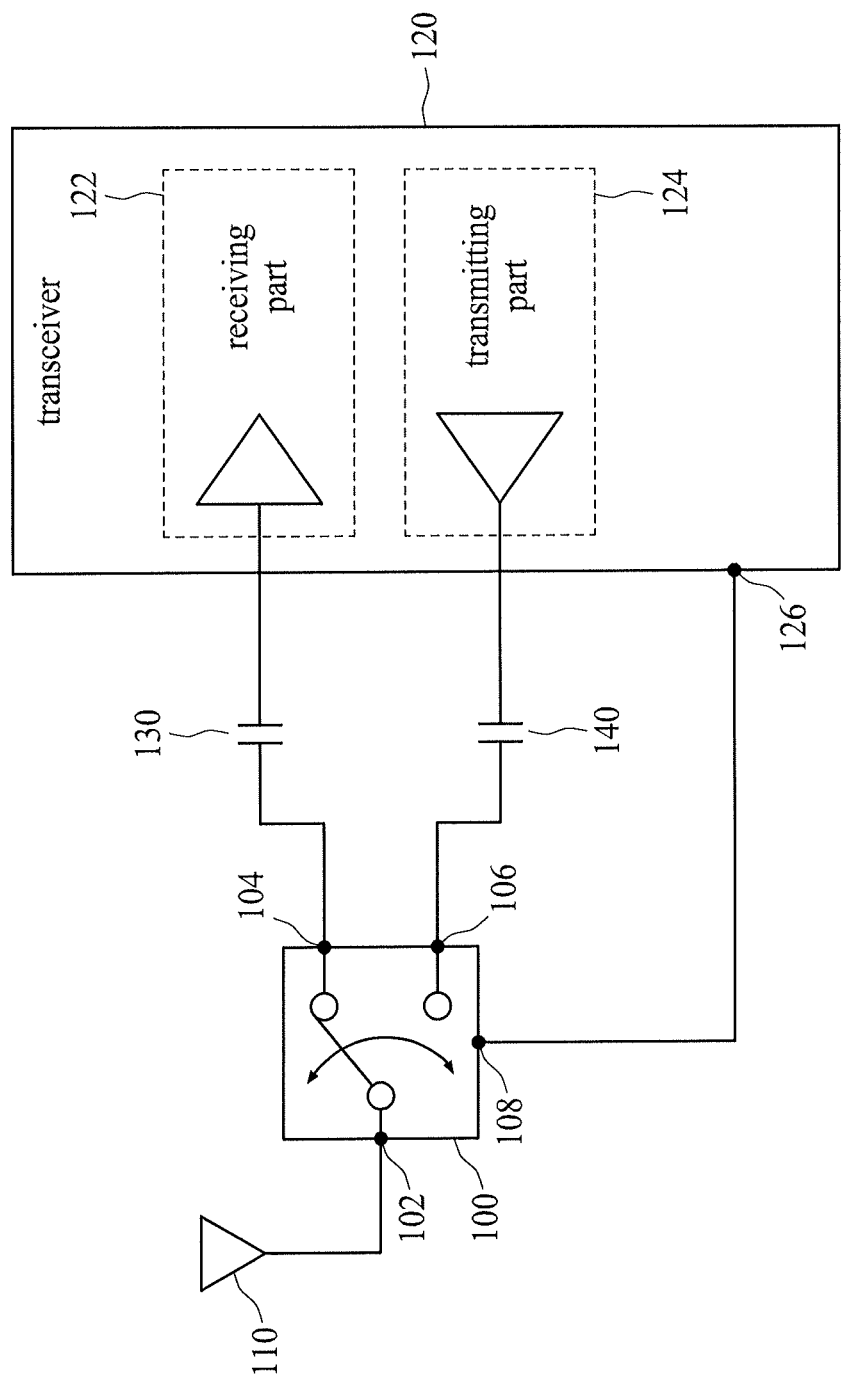
FIG. 1 shows a conventional signal splitting apparatus applied to a wireless transmitting and receiving apparatus.
Figure 2:
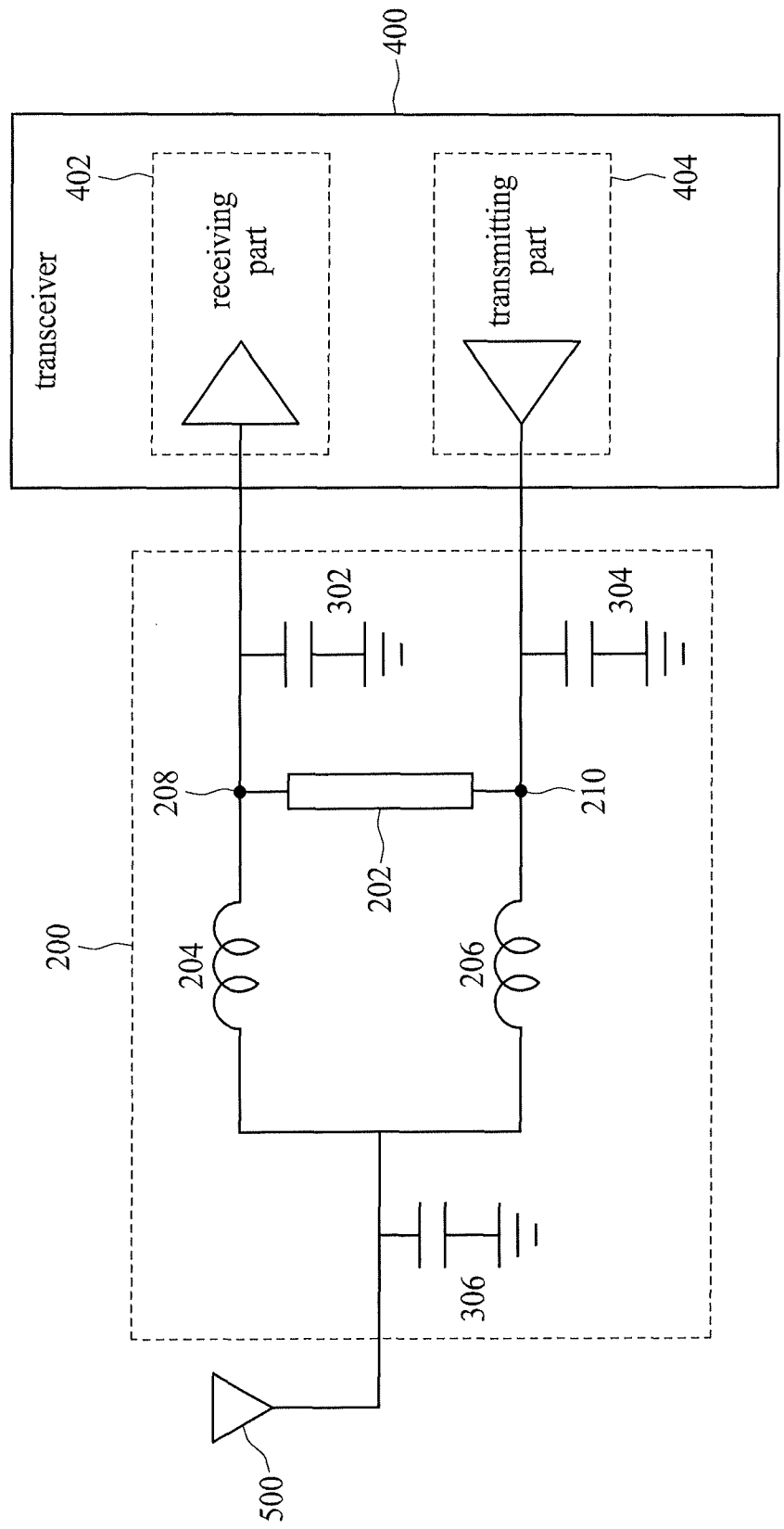
FIG. 2 shows a signal splitting apparatus applied to a wireless transmitting and receiving apparatus according to one embodiment of the present invention.

FIG. 2 shows a signal splitting apparatus applied to a wireless transmitting and receiving apparatus according to one embodiment of the present invention. The signal splitting apparatus 200 is installed between a transceiver 400 and an antenna module 500, and comprises a micro-strip line 202, a first inductor 204 and a second inductor 206. The micro-strip line 202 comprises a first end 208 and a second end 210 grounded via a first capacitor 302 and a second capacitor 304, respectively. The first end 208 is electrically coupled to a receiving part 402 of the transceiver 400. The second end 210 is electrically coupled to a transmitting part 404 of the transceiver 400. One end of the first inductor 204 is electrically coupled to the first end 208 of the micro-strip 202. The other end of the first inductor 204 is electrically coupled to the second end 210 of the micro-strip 202 and is grounded via a third capacitor 306. One end of the second inductor 206 is electrically coupled to the second end 210 of the micro-strip 202. The other end of the second inductor 206 is electrically coupled to the antenna module 500. Preferably, the first inductor 204, the second inductor 206, the first capacitor 302, the second capacitor 304 and the third capacitor 306 are lumped elements. Similar to the conventional signal splitting apparatus 100 shown in FIG. 1, the signal splitting apparatus 200 is coupled to the receiving part 402 and the transmitting part 404 of the transceiver 400 via capacitors, which may be external or internal to the transceiver 400. As shown in FIG. 2, in this embodiment, these capacitors are integrated inside the transceiver 400.

In this embodiment, the system impedance $Z_0$ of the transceiver 400 is 50 ohms. To reduce the energy loss while transmitting and receiving signals, the load impedance of the antenna module 500 is designed to match the system impedance $Z_0$ of the transceiver 400. In this embodiment, the transceiver 400 exhibits the following features:

When the transceiver 400 is operated in a receiving mode, the load impedance of the receiving part 402 of the transceiver 400 matches the system impedance $Z_0$ of the transceiver 400, and the load impedance of the transmitting part 404 of the transceiver 400 is greater than that of the receiving part 402 of the transceiver 400. For example, the load impedance of the transmitting part 404 of the transceiver 400 is more than ten times that of the receiving part 402 of the transceiver 400. Preferably, the load impedance of the transmitting part 404 of the transceiver 400 is more than 20 times that of the receiving part 402 of the transceiver 400.

When the transceiver 400 is operated in a transmitting mode, the load impedance of the transmitting part 404 of the transceiver 400 matches the system impedance $Z_0$ of the transceiver 400, and the load impedance of the receiving part 402 of the transceiver 400 is greater than that of the transmitting part 404 of the transceiver 400. For example, the load impedance of the receiving part 402 of the transceiver 400 is more than ten times that of the transmitting part 404 of the transceiver 400. Preferably, the load impedance of the receiving part 402 of the transceiver 400 is more than 20 times that of the transmitting part 404 of the transceiver 400.

Figure 3:
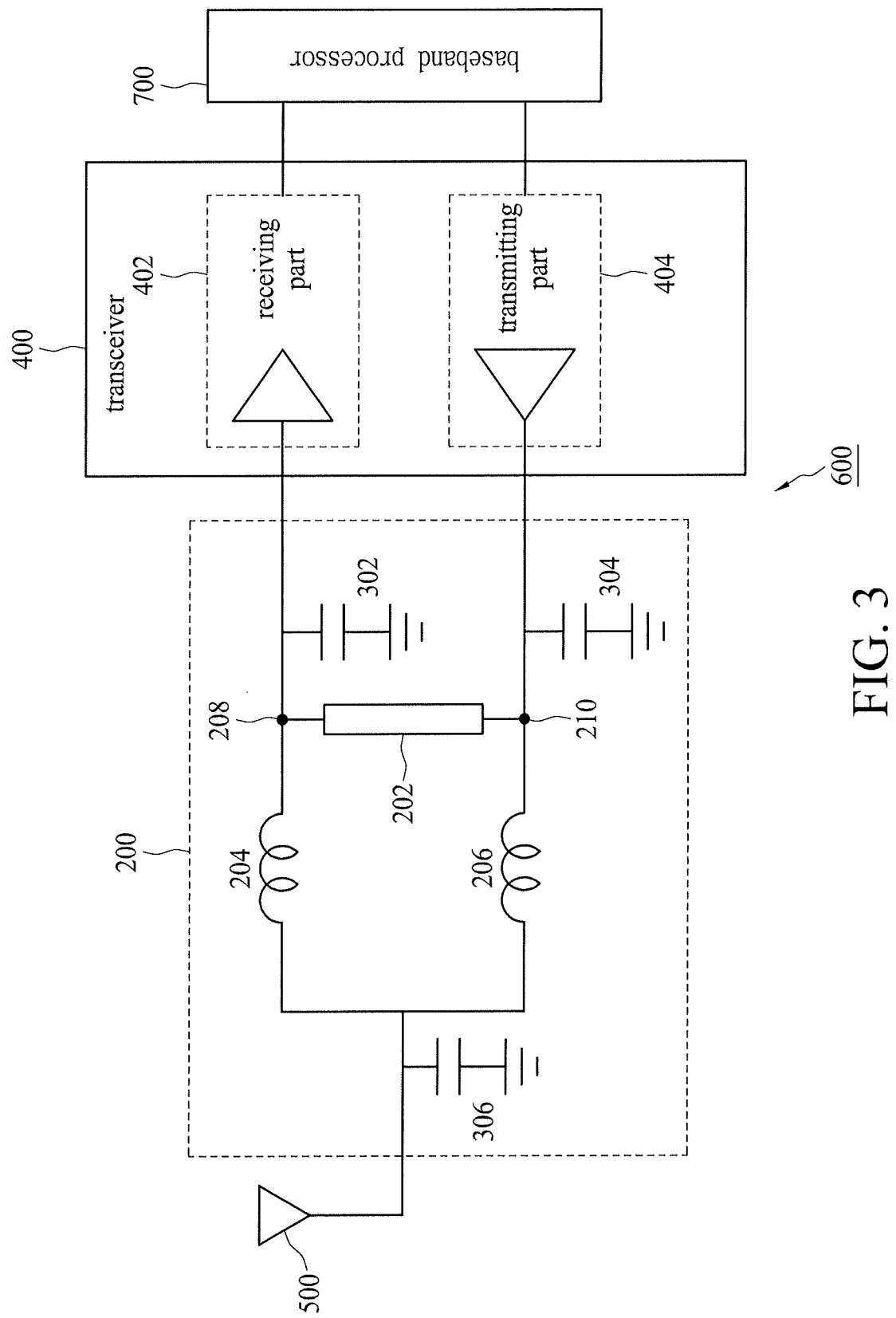
FIG. 3 shows a wireless communication device according to one embodiment of the present invention.

FIG. 3 shows a wireless communication device according to one embodiment of the present invention. As shown in FIG. 3, the wireless communication device 600 comprises a baseband processor 700, a transceiver 400 and a signal splitting apparatus 200. The transceiver 400 corresponds to the transceiver 400 shown in FIG. 2 and is coupled to the baseband processor 700. The signal splitting apparatus 200 corresponds to the signal splitting apparatus 200 shown in FIG. 2 and is coupled to the transceiver 400 and an antenna module 500.

Figure 4:
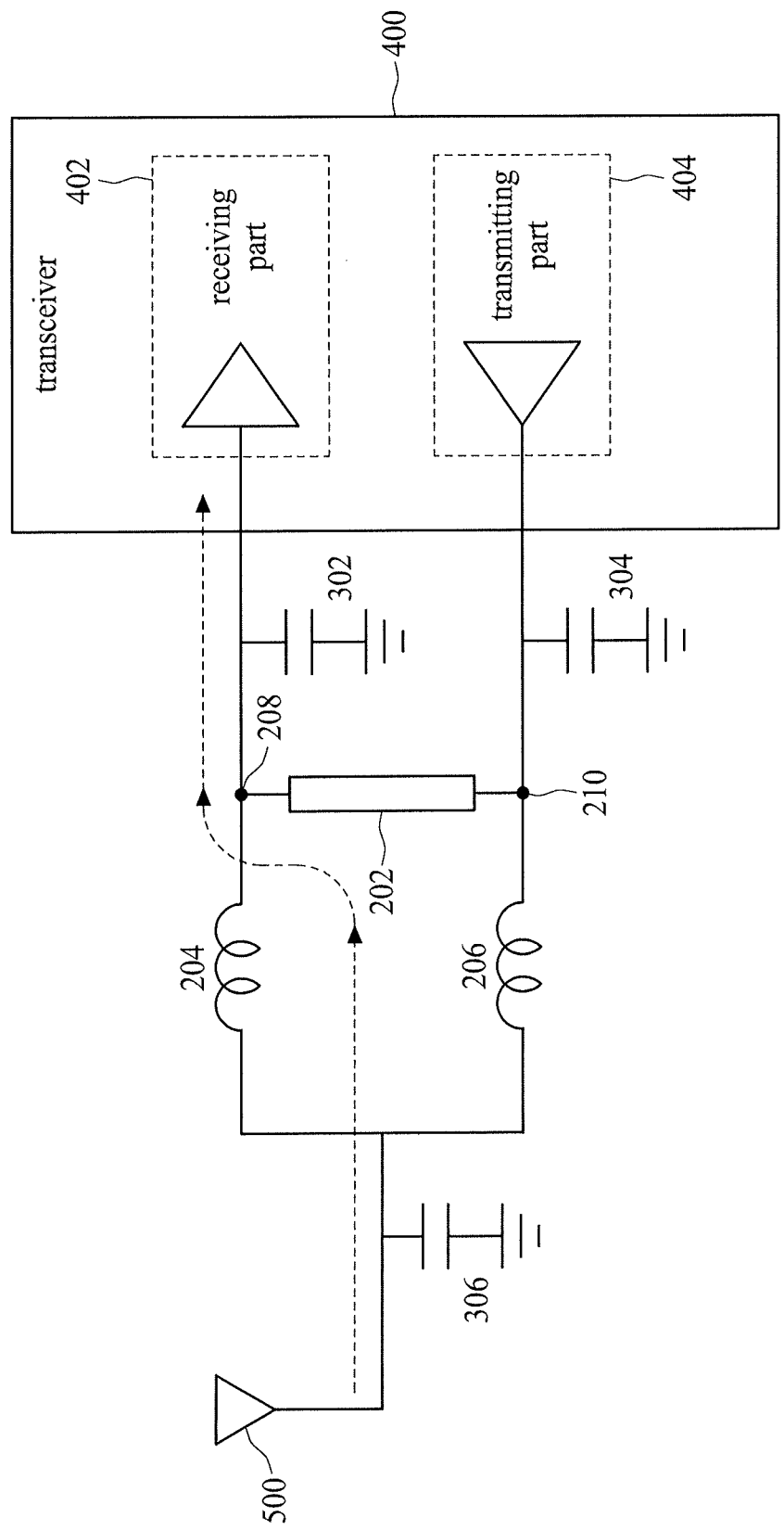
FIG. 4 shows the propagation direction of a receiving signal when a transceiver according to one embodiment of the present invention is operated in a receiving mode.

FIG. 4 shows the propagation direction of a receiving signal when the transceiver 400 is operated in a receiving mode. When the antenna module 500 receives a receiving signal, the load impedance of the transmitting part 404 of the transceiver 400 is far greater than that of the receiving part 402 of the transceiver 400, and the load impedance of the receiving part 402 of the transceiver 400 matches the load impedance of the antenna module 500. According to signal propagation principle, if there are two routes for a signal outputted from a signal output port to pass through, the signal will pass through the route having a load impedance closer to that of the signal output port. Accordingly, the receiving signal propagates along the arrow shown in FIG. 4 and enters the receiving part 402 of the transceiver 400.

Figure 5:
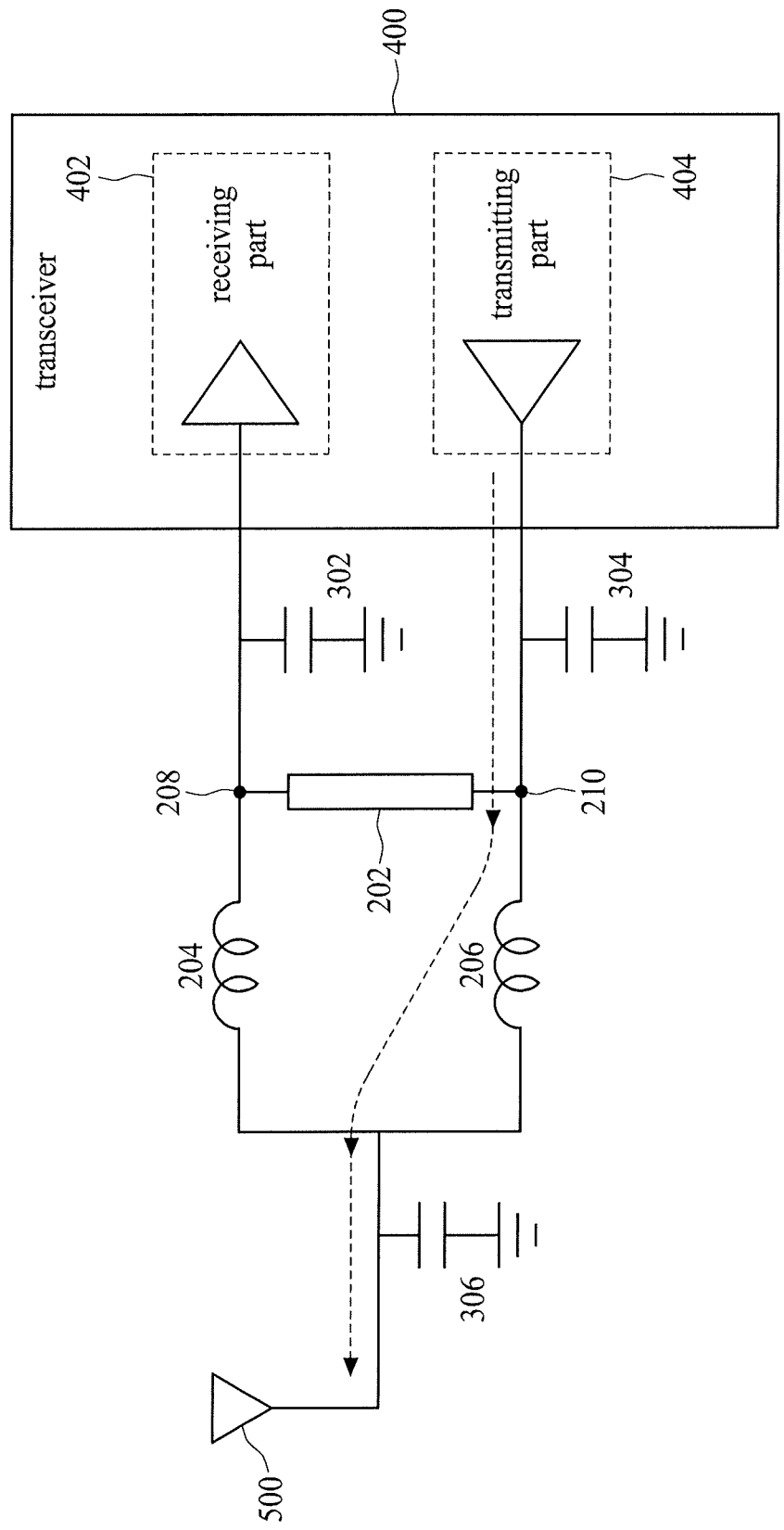
FIG. 5 shows the propagation direction of a transmitting signal when a transceiver is operated in a transmitting mode according to one embodiment of the present invention.

FIG. 5 shows the propagation direction of a transmitting signal when the transceiver 400 is operated in a transmitting mode. When the transmitting part 404 of the transceiver 400 transmits a transmitting signal, the load impedance of the receiving part 402 of the transceiver 400 is far greater than that of the transmitting part 404 of the transceiver 400, and the load impedance of the transmitting part 404 of the transceiver 400 matches the load impedance of the antenna module 500. According to signal propagation principle, the transmitting signal propagates along the arrow shown in FIG. 5 and enters the antenna module 500.

Figure 6:
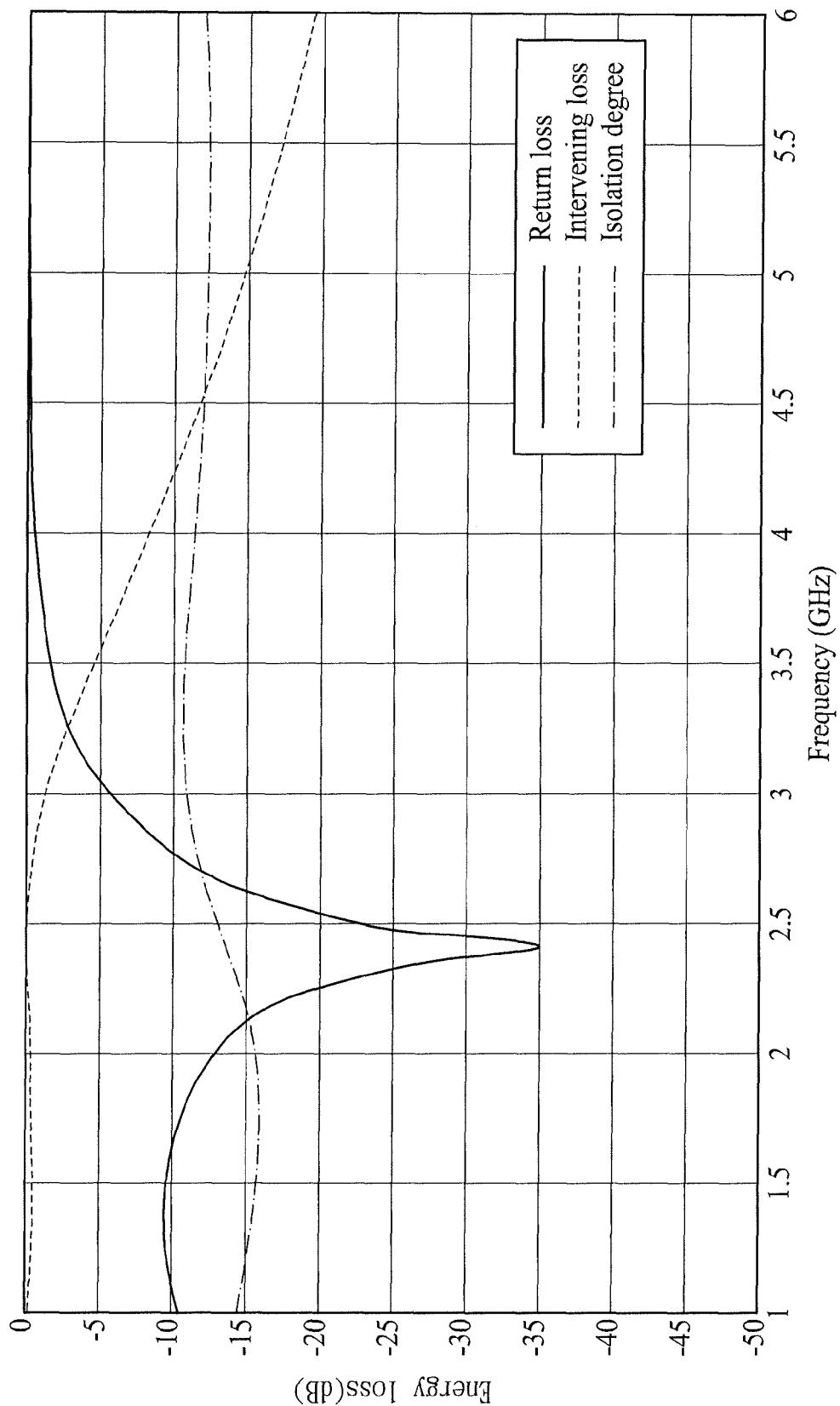
FIG. 6 shows the reflection characteristics of a receiving part of a transceiver, a transmitting part of the transceiver and an antenna module when the transceiver is operated in a receiving mode according to one embodiment of the present invention.

FIG. 6 shows the reflection characteristics of the receiving part 402 of the transceiver 400, the transmitting part 404 of the transceiver 400, and the antenna module 500 when the transceiver 400 is operated in a receiving mode. In this embodiment, the length of micro-strip line 202 ranges from 10 mm to 1000 mm, and the width of the micro-strip line 202 ranges from 5 mm to 150 mm. The inductance of the first inductor 204 ranges from 1 nH to 100 nH. The inductance of the second inductor 206 ranges from 1 nH to 100 nH. The capacitance of the first capacitor 302 ranges from 0.3 pF to 220 pF. The capacitance of the second capacitor 304 ranges from 0.3 pF to 220 pF. The capacitance of the third capacitor 306 ranges from 0.3 pF to 220 pF. When the transceiver 400 is operated in a receiving mode, the load impedance of the transmitting part 404 of the transceiver 400 is more than 20 times that of the receiving part 402 of the transceiver 400. When the transceiver 400 is operated in a transmitting mode, the load impedance of the receiving part 402 of the transceiver 400 is more than 20 times that of the transmitting part 402 of the transceiver 400. The signal splitting apparatus 200 is configured to operate within the frequency band ranging from 2.4 GHz to 2.5 GHz.

As shown in FIG. 6, the reflection loss of the antenna module 500, i.e. the ratio of the energy of the signal reflecting to the antenna module 500 to the energy of the signal outputted from the antenna module 500, is lower than −10 dB in the frequency band between 2.4 GHz and 2.5 GHz. The isolation degree between the transmitting part 404 of the transceiver 400 and the receiving part 402 of the transceiver 400, i.e. the ratio of the energy of the signal propagating to the transmitting part 404 of the transceiver 400 to the energy of the signal propagating to the receiving part 402 of the transceiver 400, is also lower than −10 dB in the frequency band between 2.4 GHz and 2.5 GHz. The intervening loss of the receiving part 402 of the transceiver 400 to the antenna module 500, i.e. the ratio of the energy of the signal propagating to the receiving part 402 of the transceiver 400 to the energy of the signal outputted from the antenna module 500, is higher than −1 dB in the frequency band between 2.4 GHz and 2.5 GHz. Accordingly, when the wireless communication device according to this embodiment is operated in a receiving mode and within the frequency band between 2.4 GHz and 2.5 GHz, low energy loss and high isolation degree are achieved between the antenna module 500 and the transceiver 400.

Figure 7:
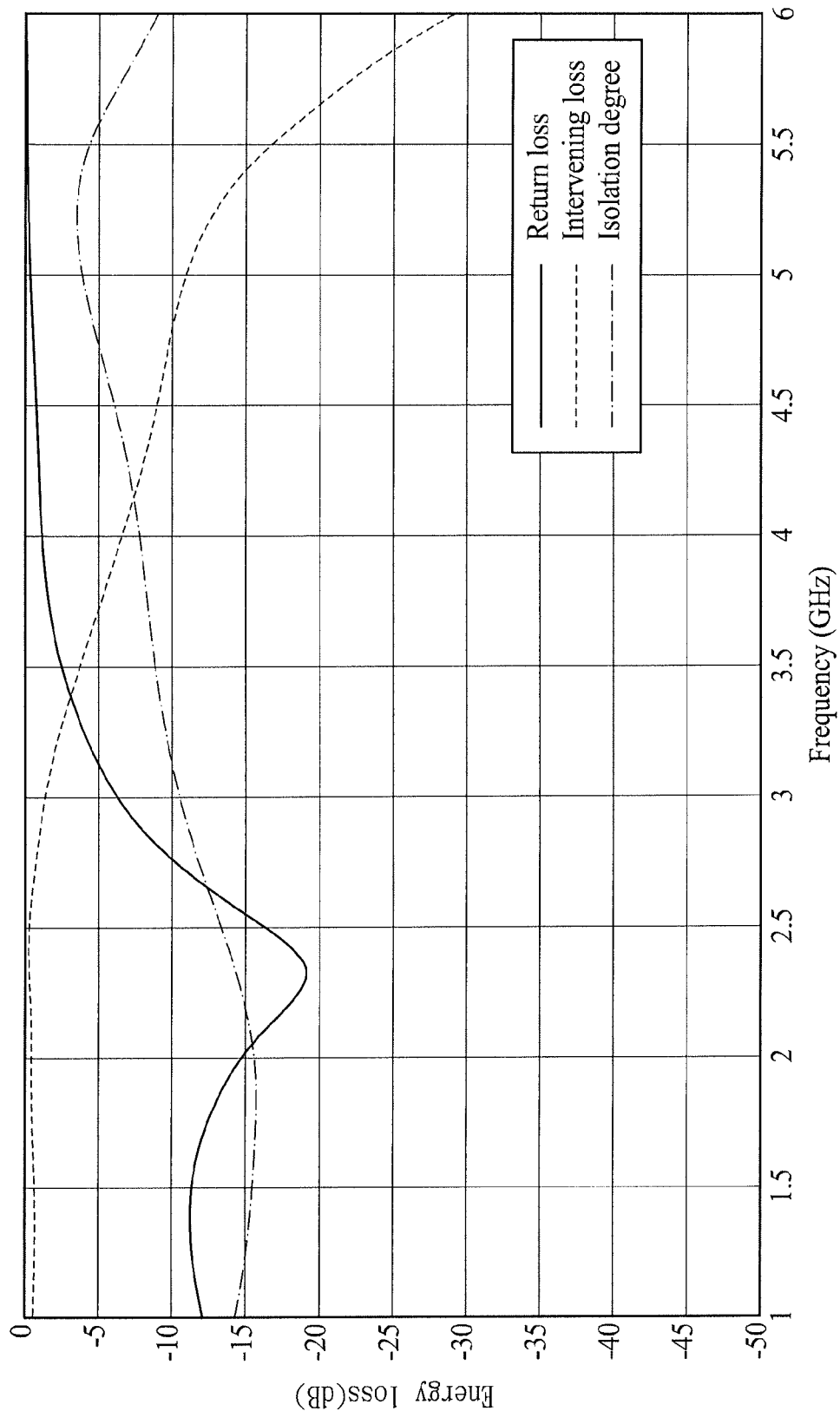
FIG. 7 shows the reflection characteristics of a receiving part of a transceiver, a transmitting part of the transceiver and an antenna module when the transceiver is operated in a transmitting mode according to one embodiment of the present invention.

FIG. 7 shows the reflection characteristics of the receiving part 402 of the transceiver 400, the transmitting part 404 of the transceiver 400 and the antenna module 500 when the transceiver 400 is operated in a transmitting mode. As shown in FIG. 7, the reflection loss of the transmitting part 404 of the transceiver 400, i.e. the ratio of the energy of the signal reflecting to the transmitting part 404 of the transceiver 400 to the energy of the signal outputted from the transmitting part 404 of the transceiver 400, is lower than −10 dB in the frequency band between 2.4 GHz and 2.5 GHz. The isolation degree between the transmitting part 404 of the transceiver 400 and the receiving part 402 of the transceiver 400, i.e. the ratio of the energy of the signal propagating to the receiving part 402 of the transceiver 400 to the energy of the signal outputted from the transmitting part 404 of the transceiver 400, is also lower than −10 dB in the frequency band between 2.4 GHz and 2.5 GHz. The intervening loss of the antenna module 500 to the transmitting part 404 of the transceiver 400, i.e. the ratio of the energy of the signal propagating to the antenna module 500 to the energy of the signal outputted from the transmitting part 404 of the transceiver 400, is higher than −1 dB in the frequency band between 2.4 GHz and 2.5 GHz. Accordingly, when the wireless communication device according to this embodiment is operated in a transmitting mode and within the frequency band between 2.4 GHz and 2.5 GHz, low energy loss and high isolation degree are achieved between the antenna module 500 and the transceiver 400.

In conclusion, by exploiting the difference of the load impedances of the active part and the inactive part of the transceiver when operating in a receiving mode or a transmitting mode, the signal splitting apparatus according to the present invention can automatically split signals. Therefore, the conventional signal splitting apparatus can be replaced without the need for an additional control signal line. In addition, the signal splitting apparatus according to the present invention only comprises inductors and micro-strip lines, and thus is cost effective.

The above-described embodiments of the present invention are intended to be illustrative only. Those skilled in the art may devise numerous alternative embodiments without departing from the scope of the following claims.

What is claimed is:

1. A signal splitting apparatus, comprising:
a micro-strip line, comprising a first end and a second end, grounded via a first capacitor and a second capacitor, respectively, wherein the first end and the second end of the micro-strip line are electrically coupled to a receiving part of a transceiver and a transmitting part of the transceiver, respectively;
a first inductor, one end of which is electrically coupled to the first end of the micro-strip, and the other end of which is electrically coupled to to an antenna module and grounded via a third capacitor; and
a second inductor, one end of which is coupled to the second end of the micro-strip, and the other end of which is electrically coupled to the antenna module.

2. The signal splitting apparatus of claim 1, wherein when the transceiver is operated in a receiving mode, the load impedance of the transmitting part of the transceiver is more than ten times that of the receiving part of the transceiver, and the load impedance of the receiving part of the transceiver matches that of the antenna module.

3. The signal splitting apparatus of claim 1, wherein when the transceiver is operated in a transmitting mode, the load impedance of the receiving part of the transceiver is more than ten times that of the transmitting part of the transceiver, and the load impedance of the transmitting part of the transceiver matches that of the antenna module.

4. The signal splitting apparatus of claim 1, wherein the length of micro-strip line ranges from 10 mm to 1000 mm, and the width of the micro-strip line ranges from 5 mm to 150 mm.

5. The signal splitting apparatus of claim 1, wherein the inductance of the first inductor ranges from 1 nH to 100 nH.

6. The signal splitting apparatus of claim 1, wherein the inductance of the second inductor ranges from 1 nH to 100 nH.

7. The signal splitting apparatus of claim 1, wherein the capacitance of the first capacitor ranges from 0.3 pF to 220 pF.

8. The signal splitting apparatus of claim 1, wherein the capacitance of the second capacitor ranges from 0.3 pF to 220 pF.

9. The signal splitting apparatus of claim 1, wherein the capacitance of the third capacitor ranges from 0.3 pF to 220 pF.

10. The signal splitting apparatus of claim 1, wherein the first capacitor, the second capacitor and the third capacitor are lumped typed capacitors.

11. The signal splitting apparatus of claim 1, wherein the first inductor and the second inductor are lumped typed inductors.

12. A wireless communication device, comprising:
a baseband processor;
a transceiver, coupled to the baseband processor; and
a signal splitting apparatus, coupled to the transceiver, the signal splitting apparatus comprising:
a micro-strip line, comprising a first end and a second end grounded via a first capacitor and a second capacitor, respectively, wherein the first end and the second end of the micro-strip line are electrically coupled to a receiving part of the transceiver and a transmitting part of the transceiver, respectively;
a first inductor, one end of which is electrically coupled to the first end of the micro-strip, and the other end of which is electrically coupled to an antenna module and grounded via a third capacitor; and
a second inductor, one end of which is coupled to the second end of the micro-strip, and the other end of which is electrically coupled to the antenna module.

13. The wireless communication device of claim 12, wherein when the transceiver is operated in a receiving mode, the load impedance of the transmitting part of the transceiver is more than ten times that of the receiving part of the transceiver, and the load impedance of the receiving part of the transceiver matches that of the antenna module.

14. The wireless communication device of claim 12, wherein when the transceiver is operated in a transmitting mode, the load impedance of the receiving part of the transceiver is more than ten times that of the transmitting part of the transceiver, and the load impedance of the transmitting part of the transceiver matches that of the antenna module.

15. The wireless communication device of claim 12, wherein the length of micro-strip line ranges from 10 mm to 1000 mm, and the width of the micro-strip line ranges from 5 mm to 150 mm.

16. The wireless communication device of claim 15, wherein the first inductor and the second inductor are lumped typed inductors.

17. The wireless communication device of claim 12, wherein the inductance of the first inductor ranges from 1 nH to 100 nH.

18. The wireless communication device of claim 12, wherein the inductance of the second inductor ranges from 1 nH to 100 nH.

19. The wireless communication device of claim 12, wherein the capacitance of the first capacitor ranges from 0.3 pF to 220 pF.

20. The wireless communication device of claim 12, wherein the capacitance of the second capacitor ranges from 0.3 pF to 220 pF.

21. The wireless communication device of claim 12, wherein the capacitance of the third capacitor ranges from 0.3 pF to 220 pF.

22. The wireless communication device of claim 12, wherein the first capacitor, the second capacitor and the third capacitor are lumped typed capacitors.

\* \* \* \* \*